(12) United States Patent
Xu

(10) Patent No.: US 11,371,117 B2
(45) Date of Patent: Jun. 28, 2022

(54) PROCESS FOR MULTI-RECYCLING, LOW-ENERGY AND HIGH-PURITY EXTRACTION OF LITHIUM

(71) Applicant: CENTRAL ENERGY SCIENCE TECHNOLOGY LTD., New Taipei (TW)

(72) Inventor: Yi-Yang Xu, Hefei (CN)

(73) Assignee: CENTRAL ENERGY SCIENCE TECHNOLOGY LTD., New Taipei (TW)

( * ) Notice: Subject to any disclaimer, the term of this patent is extended or adjusted under 35 U.S.C. 154(b) by 463 days.

(21) Appl. No.: 16/503,149

(22) Filed: Jul. 3, 2019

(65) Prior Publication Data
US 2020/0392602 A1    Dec. 17, 2020

(30) Foreign Application Priority Data

Jun. 12, 2019    (TW) .................................. 108120265

(51) Int. Cl.
| | |
|---|---|
| *C22B 3/00* | (2006.01) |
| *C22B 3/24* | (2006.01) |
| *C22B 3/04* | (2006.01) |
| *C22B 3/10* | (2006.01) |
| *C22B 26/12* | (2006.01) |
| *C22B 1/00* | (2006.01) |
| *C22B 3/42* | (2006.01) |

(52) U.S. Cl.
CPC .................. *C22B 3/24* (2013.01); *C22B 1/00* (2013.01); *C22B 3/045* (2013.01); *C22B 3/10* (2013.01); *C22B 3/42* (2013.01); *C22B 26/12* (2013.01)

(58) Field of Classification Search
CPC .... C22B 3/22; C22B 3/08; C22B 3/24; C22B 3/045; C22B 3/10; C22B 3/42; C22B 26/12; C22B 1/00
See application file for complete search history.

(56) References Cited

U.S. PATENT DOCUMENTS 11,174,532 B1 *  11/2021  Harrison .............. B01D 61/025

* cited by examiner

*Primary Examiner* — Steven J Bos
(74) *Attorney, Agent, or Firm* — Pai Patent & Trademark Law Firm; Chao-Chang David Pai

(57) ABSTRACT

A process for multi-recycling, low-energy and high-purity extraction of lithium increases the purity and the concentration of lithium ions in produced solutions gradually through steps of adsorption/desorption ion exchange, extraction, impurity separation, agent separation and concentration, during which extractive liquids are returned, recycled and processed in previous steps for fewer dosages of chemicals and fewest discharged effluents, lower manufacturing costs than existing techniques, low specific energy consumption and consumable loss, and high-purity products with lithium ions.

10 Claims, 2 Drawing Sheets ized process for multi-recycling, low-energy and high-purity extraction of lithium in the present disclosure is a car-borne facility with core units packed into a forty-foot equivalent unit (FEU). On the other hand, raw material solutions usually contain low-concentration lithium ions which are compatible with multiple foreign ions for production of high-purity high-concentration solutions with lithium-bearing compounds, for example, lithium chloride solution, lithium hydroxide solution, etc.

PROCESS FOR MULTI-RECYCLING, LOW-ENERGY AND HIGH-PURITY EXTRACTION OF LITHIUM

FIELD OF THE INVENTION

The present disclosure relates to a process for extraction of lithium, particularly a process for multi-recycling, low-energy and high-purity extraction of lithium.

BACKGROUND OF THE INVENTION

Lithium, a core chemical element of the modern electronic industry and a basic substance of the digital facility industry or the new-energy vehicle industry, is exploited from liquid lithium mineral resources mostly or solid lithium mineral resources.

The technology to extract lithium from liquid minerals is criticized for three drawbacks as follows: (1) high specific energy consumption for production of lithium through the electrodialysis device array or the high-pressure filtering membrane/tube array, each of which is an energy-intensive facility; (2) a great quantity of strong acids consumed and residual in effluents which should be processed before discharges; (3) poor selectivity and low separation efficiency of produced lithium which satisfies the general industrial standard and further processing in other energy-intensive or raw-material-intensive facilities is needed for battery-grade lithium.

As one technical option which is currently neither low-cost nor environment-friendly, the technology to extract lithium from liquid minerals is not as good as the technology to extract lithium from solid minerals due to the competitive disadvantage in prices. However, scarcity and limited reserves of solid lithium ores are impelling the lithium battery material manufacturers to discover an alternative technology to extract lithium with lower energy consumption and fewer liquid minerals to be discharged. That is, the existing technology for extracting lithium needs to be upgraded and revamped.

SUMMARY OF THE INVENTION

To settle the above problems, a process for multi-recycling, low-energy and high-purity extraction of lithium in which the ion exchange tower, extraction facilities, separation membranes and technologies such as ion absorption, membrane separation and electrodialysis are integrated for extraction of lithium with the battery-grade purity at the low specific energy consumption is provided herein. As shown in the process of the present disclosure, the cost of production and the level of environmental protection are optimized because of neither demand for a great quantity of strong acids nor discharges of effluents with strong acids. Additionally, a downsized process for multi-recycling, low-energy and high-purity extraction of lithium in the present disclosure is a car-borne facility with core units packed into a forty-foot equivalent unit (FEU). On the other hand, raw material solutions usually contain low-concentration lithium ions which are compatible with multiple foreign ions for production of high-purity high-concentration solutions with lithium-bearing compounds, for example, lithium chloride solution, lithium hydroxide solution, etc.

A process for multi-recycling, low-energy and high-purity extraction of lithium in the present disclosure comprises steps as follows:

Step 1: raw material solutions are pretreated with desorption agents for production of a precursor solution of lithium ions, desorption agents and foreign ions;

Step 2: the precursor solution with lithium ions is processed in a first impurity separation through which a first extractive liquid and a second extractive liquid are produced, wherein the concentration of foreign ions in the first extractive liquid ranges from 0.1 to 30 ppm and the concentration of foreign ions in the second extractive liquid ranges from 60 to 6,000 ppm;

Step 3: the first extractive liquid is processed for separation of the desorption agents through which a third extractive liquid and a fourth extractive liquid are produced, wherein the concentration of the lithium ions in the third extractive liquid ranges from 1 to 150 ppm and the concentration of the lithium ions in the fourth extractive liquid ranges from 250 to 2,500 ppm;

Step 4: the fourth extractive liquid is concentrated for production of a fifth extractive liquid and a sixth extractive liquid, wherein the concentration of the lithium ions in the fifth extractive liquid ranges from 1 to 150 ppm and the concentration of the lithium ions in the sixth extractive liquid ranges from 2,500 to 20,000 ppm;

Step 5: the sixth extractive liquid is processed in a second impurity separation through which a seventh extractive liquid and an eighth extractive liquid are produced, wherein the concentration of the lithium ions in the seventh extractive liquid ranges from 2,500 to 20,000 ppm (for solutions with high-concentration high-purity lithium ions) and the concentration of foreign ions in the eighth extractive liquid ranges from 60 to 6,000 ppm.

In the process, pretreatment is defined as one of adsorption/desorption ion exchange, membrane separation or extraction.

In the process, the desorption agents used in the pretreatment in Step 1 are hydrochloric acid or sulfuric acid with a concentration less than 0.5 mol/L.

In the process, the second extractive liquid is returned and processed in step 1.

In the process, the third extractive liquid adjusted for a proper concentration is returned and processed in step 1.

In the process, the fifth extractive liquid adjusted for a proper concentration is returned and processed in step 1 and/or step 3.

In the process, the eighth extractive liquid adjusted for a proper concentration is returned and processed in step 2.

In the process, the seventh extractive liquid is supplied to lithium battery material manufacturers as high-purity materials or dried and dehydrated as battery-grade lithium-bearing powders.

In the process, the seventh extractive liquid is further processed for production of high-purity lithium hydroxide and by-products of acid solutions to be adjusted for a proper concentration and returned and processed in step 1.

DETAILED DESCRIPTION OF THE PREFERRED EMBODIMENT

Figure 1:
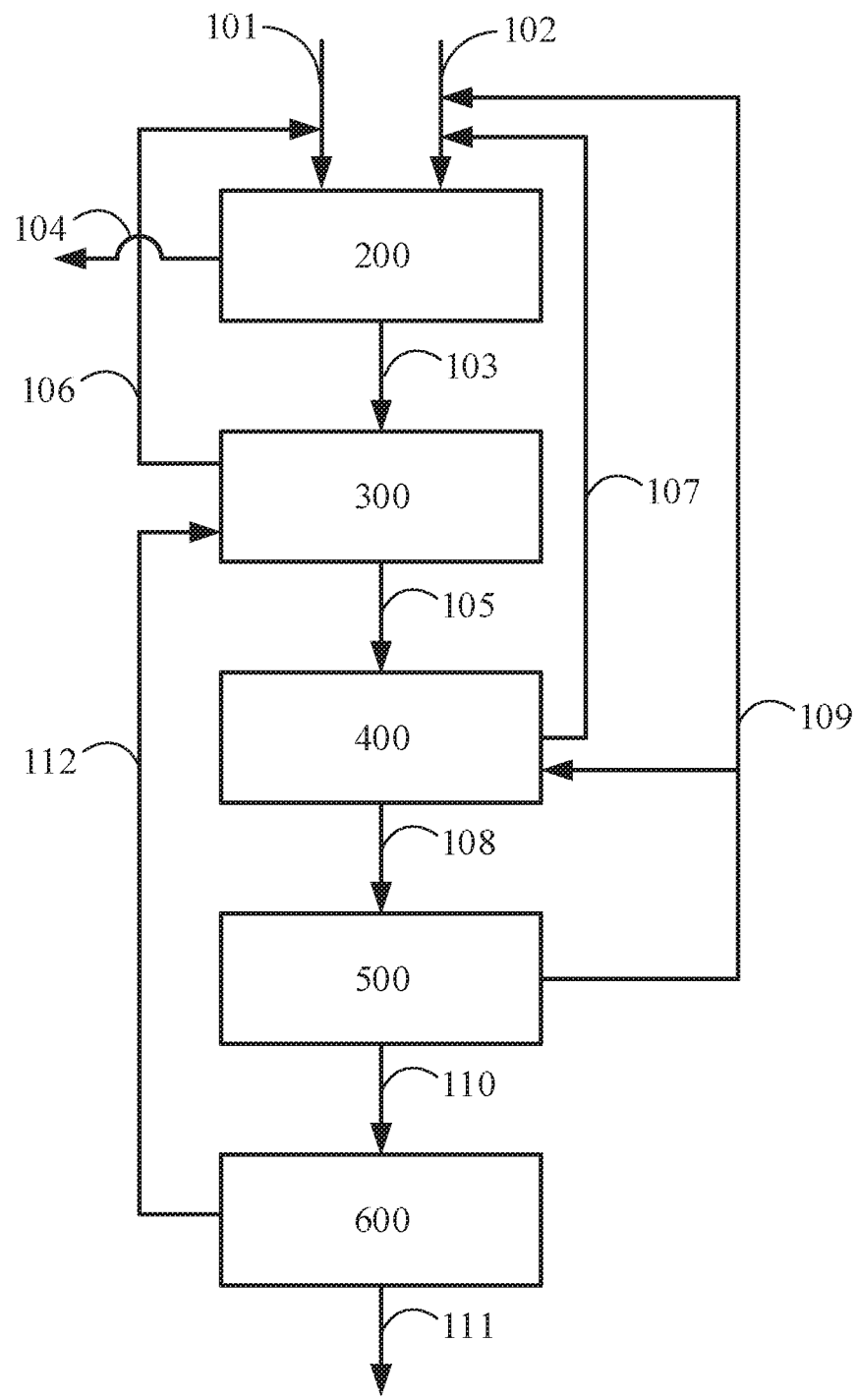
FIG. 1 is a schematic view of the facility structure of a process for multi-recycling, low-energy and high-purity extraction of lithium in an embodiment.

Referring to FIG. 1, which is a schematic view of facility structure of a process for multi-recycling, low-energy and high-purity extraction of lithium in an embodiment with respect to "pretreatment" conducted in an ion exchange tower for adsorption/desorption ion exchange. However, "pretreatment" in the process may be conducted, without limitation, by technical measures through which liquids with mostly lithium ions (the ratio of lithium ions to total metal ions being greater than 50%) are transformed, refined, filtrated or extracted from raw materials and the technical measures should be incorporated in the scope to be claimed for "pretreatment".

Firstly, raw material solutions and liquid desorption agents are fed through a raw material runner 101 and a desorption agent runner 102, respectively, into an adsorption/desorption module 200 for adsorption/desorption ion exchange of lithium ions; then, desorption liquids (namely, precursor solution) and effluents are discharged from a desorption liquid runner 103 and an effluent runner 104, respectively. The desorption liquids are fed through a desorption liquid runner 103 into a first impurity separation module 300 for impurity separation, during which a first extractive liquid with fewer foreign ions and a second extractive liquid with more foreign ions are produced and discharged from a first extractive liquid runner 105 and a second extractive liquid runner 106, respectively; the second extractive liquid through the second extractive liquid runner 106 is returned to the raw material runner 101 for adsorption/desorption ion exchange of lithium ions again. The first extractive liquid through the first extractive liquid runner 105 is fed into a desorption agent separation module 400 for separation of desorption agents, during which a third extractive liquid with low-concentration lithium ions and a fourth extractive liquid with high-concentration lithium ions are produced and discharged from a third extractive liquid runner 107 and a fourth extractive liquid runner 108, respectively. Moreover, the third extractive liquid adjusted for a proper concentration through the third extractive liquid runner 107 is returned to the desorption agent runner 102 for adsorption/desorption ion exchange of lithium ions again. The fourth extractive liquid through the fourth extractive liquid runner 108 is fed into a concentration module 500, in which a fifth extractive liquid with low-concentration lithium ions and a sixth extractive liquid with high-concentration lithium ions are produced and discharged from a fifth extractive liquid runner 109 and a sixth extractive liquid runner 110, respectively; the fifth extractive liquid through the fifth extractive liquid runner 109 is either returned to the desorption agent separation module 400 or adjusted for a proper concentration and returned to the desorption agent runner 102 for adsorption/desorption ion exchange of lithium ions again. The sixth extractive liquid through the sixth extractive liquid runner 110 is fed into the second impurity separation module 600 for impurity separation, during which a seventh extractive liquid with fewer foreign ions and an eighth extractive liquid with more foreign ions are produced and discharged from a seventh extractive liquid runner 111 and an eighth extractive liquid runner 112, respectively; the eighth extractive liquid through the eighth extractive liquid runner 112 is returned to the first impurity separation module 300; the seventh extractive liquid with ultra-high-concentration lithium ions is supplied to lithium battery material manufacturers as high-purity materials or dried and dehydrated as battery-grade lithium-bearing powders to be transported and stored.

Figure 2:
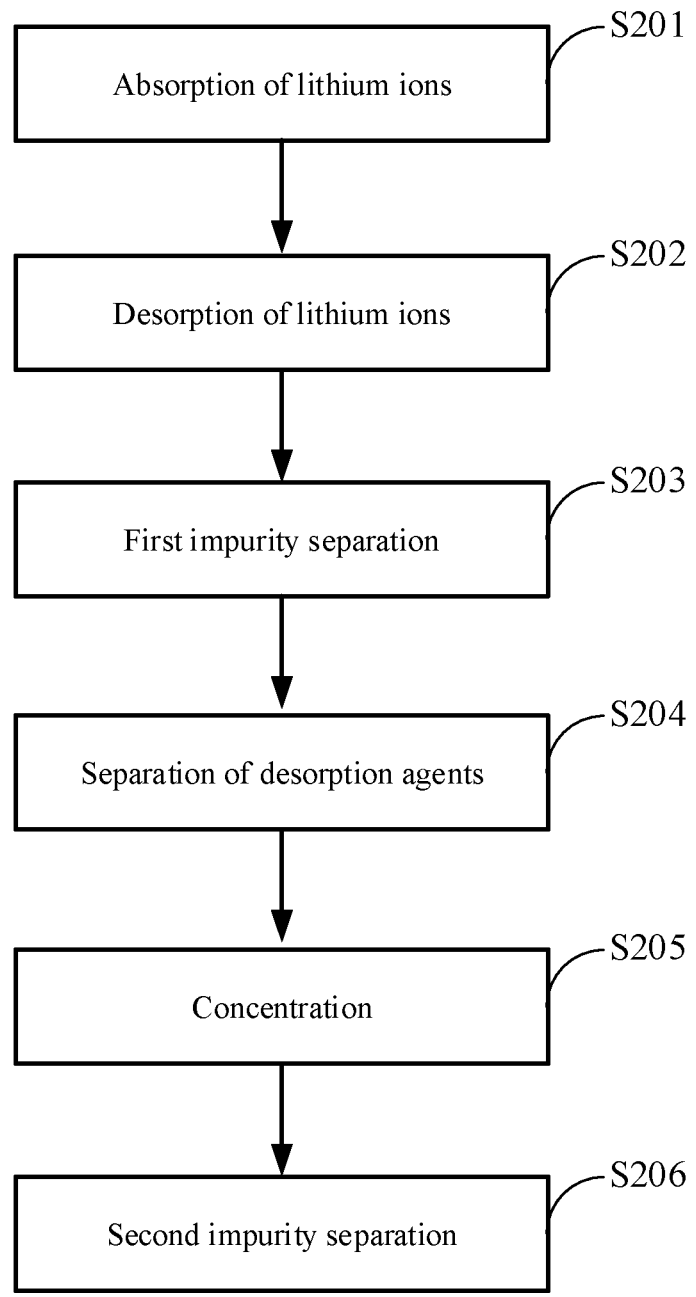
FIG. 2 is a flow chart of a process for multi-recycling, low-energy and high-purity extraction of lithium in an embodiment.

Referring to FIG. 2, which is a flow chart of a process for multi-recycling, low-energy and high-purity extraction of lithium in an embodiment with steps as follows:

Step S201, absorption of lithium ions: raw material solutions with lithium ions are fed into an ion exchange tower in which lithium ions are absorbed through manganese-bearing or titanium-bearing absorbents in the ion exchange tower;

Step S202, desorption of lithium ions: lithium ions are desorbed through acid desorption agents for production of desorption liquids (namely, precursor solution);

Step S203, first impurity separation: impurities in the desorption liquids are separated for production of the first extractive liquid and the second extractive liquid, wherein the concentration of foreign ions in the first extractive liquid ranges from 0.1 to 30 ppm and the concentration of foreign ions in the second extractive liquid, which is returned to the ion exchange tower in step S201, ranges from 60 to 6,000 ppm;

Step S204, separation of desorption agents: desorption agents in the first extractive liquid are separated for production of the third extractive liquid and the fourth extractive liquid, wherein the concentration of lithium ions in the third extractive liquid, which is returned to the ion exchange tower in step S202, ranges from 1 to 150 ppm and the concentration of lithium ions in the fourth extractive liquid ranges from 250 to 2,500 ppm;

Step S205, concentration: the fourth extractive liquid is concentrated for production of the fifth extractive liquid and the sixth extractive liquid, wherein (1) the concentration of lithium ions in the fifth extractive liquid, which is returned to the ion exchange tower in step S202 and/or returned and processed for separation of desorption agents in step S204, ranges from 1 to 150 ppm; (2) the concentration of lithium ions in the sixth extractive liquid ranges from 2,500 to 20,000 ppm;

Step S206, second impurity separation: impurities in the sixth extractive liquid is separated again for production of the seventh extractive liquid and the eighth extractive liquid, wherein (1) the concentrations of lithium ions and foreign ions in the seventh extractive liquid, which is supplied to lithium battery material manufacturers as high-purity materials or dried as battery-grade lithium-bearing powders, range from 2,500 to 20,000 ppm and from 0.1 to 30 ppm, respectively; (2) the concentration of foreign ions in the eighth extractive liquid, which is adjusted for a proper concentration and returned and processed in the first impurity separation in step S203, ranges from 60 to 6,000 ppm.

FIGS. 1 and 2 illustrate a process for multi-recycling, low-energy and high-purity extraction of lithium in another embodiment. As shown in steps S201 and S202, raw material solutions with lithium ions and low-concentration acid liquid desorption agents are fed into the adsorption/desorption module 200 for adsorption/desorption ion exchange of lithium ions and production of desorption liquids and effluents. In detail, the low-concentration acid liquid desorption agents are 0.5 mol/L hydrochloric acid and the adsorption/desorption module 200 is a dynamic quick ion exchange tower in which 10~60% of liquid desorption agents involve the ion exchange reaction. In the embodiment, the desorption liquids consist of 0.4 mol/L hydrochloric acids and 0.1 mol/L lithium chloride (LiCl) (with 700 ppm lithium ions) such that 20% of liquid desorption agents participate the ion exchange reaction but 80% are kept unused.

As shown in step S203, the desorption liquids should be fed into the first impurity separation module 300, in which impurities such as magnesium ions or other foreign ions in raw material solutions are separated for production of the first extractive liquid with fewer foreign ions and the second extractive liquid with more foreign ions. In this regard, the first extractive liquid consists of 0.4 mol/L hydrochloric acid, 700 ppm lithium ions and 2 ppm magnesium ions roughly and the second extractive liquid consists of 0.4 mol/L hydrochloric acid, 700 ppm lithium ions and 200 ppm magnesium ions roughly. Then, the second extractive liquid still including lithium ions and returned is mixed with raw material solutions for adsorption/desorption ion exchange of lithium ions again. In detail, the first impurity separation module 300 is specified as but not limited to a nano-filtration membrane separation device or a specific foreign ion adsorption device.

As shown in step S204, the first extractive liquid is fed into the desorption agent separation module 400, in which desorption agents, particularly acid liquid desorption agents unreacted during the ion exchange reaction, are separated and recycled for production of the third extractive liquid with low-concentration lithium ions and the fourth extractive liquid with high-concentration lithium ions. In this regard, the third extractive liquid consists of 0.4 mol/L hydrochloric acids and 40 ppm lithium ions roughly and the fourth extractive liquid consist of 0.4 mol/L hydrochloric acid, 1500 ppm lithium ions and 4 ppm magnesium ions roughly. Then, the third extractive liquid in which concentrated hydrochloric acid or water is added is adjusted for a proper concentration and returned and mixed with the acid liquid desorption agents for adsorption/desorption ion exchange of lithium ions again; the fourth extractive liquid in which lithium ions with a proper concentration is taken as intermediate products directly and added into another processing step, for example, 1,500 ppm LiCl serves as raw materials for production of lithium fluoride (LiF). In detail, the desorption agent separation module 400 is specified as but not limited to a molecular membrane device, an RO membrane device, an electrodialysis membrane device or an electrolytic bath.

As shown in step S205, the fourth extractive liquid is fed into the concentration module 500, in which the concentration reaction is conducted for recycling of higher-concentration lithium ions and production of the fifth extractive liquid with low-concentration lithium ions and the sixth extractive liquid with high-concentration lithium ions. In detail, the fifth extractive liquid consists of 0.4 mol/L hydrochloric acid and 100 ppm lithium ions roughly and the sixth extractive liquid consists of 0.4 mol/L hydrochloric acid, 8,000 ppm lithium ions and 20 ppm magnesium ions roughly. The fifth extractive liquid is either returned to the desorption agent separation module 400 or adjusted for a proper concentration and returned to the adsorption/desorption module 200 for adsorption/desorption ion exchange of lithium ions; the sixth extractive liquid with satisfactory lithium ions and foreign ions serves as an intermediate product directly and is added into another processing step. In detail, the concentration module 500 is specified as but not limited to a molecular membrane device, an RO membrane device, an electrodialysis membrane device or an electrolytic bath.

In the concentration module 500, both lithium ions and foreign ions are concentrated. Accordingly, as shown in step S206, impurities should be separated in the second impurity separation module 600 for production of the seventh extractive liquid with fewer foreign ions and the eighth extractive liquid with more foreign ions. In detail, the seventh extractive liquid consists of 0.4 mol/L hydrochloric acid, 8,000 ppm lithium ions and 5 ppm magnesium ions roughly and the eighth extractive liquid consists of 0.4 mol/L hydrochloric acids, 8,000 ppm lithium ions and 100 ppm magnesium ions roughly. Moreover, the eighth extractive liquid adjusted for a proper concentration is returned to the first impurity separation module 300 and the seventh extractive liquid with ultra-high-concentration lithium ions is supplied to lithium battery material manufacturers as high-purity materials or dried and dehydrated for removal of water and hydrochloric acid and refined as battery-grade LiCi powders. In detail, the second impurity separation module 600 is specified as but not limited to a nano-filtration membrane separation device or a specific foreign ion adsorption device.

Alternatively, the seventh extractive liquid is reprocessed for preparation of high-purity LiOH solutions and by-products such as high-purity and low/medium-concentration hydrochloric acid solutions mostly through an electrodialysis membrane device or an electrolytic bath. Then, the seventh extractive liquid adjusted for a proper concentration serves as acid liquid desorption agents, which are returned to the adsorption/desorption module 200.

Furthermore, a process for multi-recycling, low-energy and high-purity extraction of lithium in the present disclosure comprises, without limitation, the above modules and steps which can be adjusted for a particular order, addition of another step or deletion of a single or multiple steps as required.

For fewer desorption agents in desorption liquids, the measures in prior art include an extension of the desorption reaction or a reduced excessive desorption-agent ratio through which the proportion of unreacted desorption agents is reduced. On the other hand, for a higher concentration of lithium ions in desorption liquids, the initial concentration of desorption agents for more lithium ions to be replaced in the ion exchange step should be higher than planned. However, the above two principles are contradictory to each other, for example, the conflict between an increased initial concentration of desorption agents and a reduced excessive desorption-agent ratio. Moreover, an increased concentration of desorption agents or an extension of the desorption reaction is criticized for the shortened service life of desorption agents, increased costs and poor production efficiency.

In summary, a process for multi-recycling, low-energy and high-purity extraction of lithium relies on more than one step from which high-concentration lithium is extracted and acid liquid desorption agents matching a dynamic quick ion exchange process for ion exchange within a short period of time and a longer service life of agents in contract to the prior art. In these multiple steps for separation and concentration, the concentrations of lithium ions in extractive liquids increase gradually but the concentrations of foreign ions decrease or are kept unchanged; extractive liquids in each step are recycled and returned to the previous step(s) as much as possible for fewer dosages of chemicals and fewest discharged effluents. Accordingly, with the specific energy consumption and the consumable loss lower than those of the prior art, a process for multi-recycling, low-energy and high-purity extraction of lithium is conductive to economical production of compounds with high-purity lithium ions.

What is claimed is:
1. A process for multi-recycling, low-energy and high-purity extraction of lithium, comprising steps:
  Step 1: pretreating raw material solutions containing lithium ions with absorbents and desorption agents to produce a precursor solution of lithium ions, desorption agents and foreign ions;

Step 2: causing the precursor solution to undergo a first impurity separation to produce a first extractive liquid and a second extractive liquid, wherein the concentration of foreign ions in the first extractive liquid ranges from 0.1 to 30 ppm and the concentration of foreign ions in the second extractive liquid ranges from 60 to 6,000 ppm;

Step 3: causing the first extractive liquid to undergo separation of desorption agents to produce a third extractive liquid and a fourth extractive liquid, wherein the concentration of lithium ions in the third extractive liquid ranges from 1 to 150 ppm and the concentration of lithium ions in the fourth extractive liquid ranges from 250 to 2,500 ppm;

Step 4: causing the fourth extractive liquid to be concentrated to produce a fifth extractive liquid and a sixth extractive liquid, wherein the concentration of lithium ions in the fifth extractive liquid ranges from 1 to 150 ppm and the concentration of lithium ions in the sixth extractive liquid ranges from 2,500 to 20,000 ppm; and Step 5: causing the sixth extractive liquid to undergo a second impurity separation to produce a seventh extractive liquid and an eighth extractive liquid, wherein the concentration of lithium ions in the seventh extractive liquid ranges from 2,500 to 20,000 ppm and the concentration of foreign ions in the eighth extractive liquid ranges from 60 to 6,000 ppm.

2. The process for multi-recycling, low-energy and high-purity extraction of lithium as claimed in claim 1, wherein the pretreating in Step 1 is conducted by adsorption/desorption ion exchange, membrane separation or extraction.

3. The process for multi-recycling, low-energy and high-purity extraction of lithium as claimed in claim 1, wherein the desorption agents used in pretreating the raw material solutions containing lithium ions in Step 1 are hydrochloric acid with a concentration less than 0.5 mol/L.

4. The process for multi-recycling, low-energy and high-purity extraction of lithium as claimed in claim 1, wherein the desorption agents used in pretreating the raw material solutions containing lithium ions in Step 1 are sulfuric acid.

5. The process for multi-recycling, low-energy and high-purity extraction of lithium as claimed in claim 1, wherein the second extractive liquid is returned to be combined with the raw material solutions containing lithium ions for step 1.

6. The process for multi-recycling, low-energy and high-purity extraction of lithium as claimed in claim 1, wherein the third extractive liquid after concentration adjustment is returned to be combined with the desorption agents used for the pretreating in step 1.

7. The process for multi-recycling, low-energy and high-purity extraction of lithium as claimed in claim 1, wherein the fifth extractive liquid after concentration adjustment is returned as additional feed to step 1 and/or step 3.

8. The process for multi-recycling, low-energy and high-purity extraction of lithium as claimed in claim 1, wherein the eighth extractive liquid after a concentration adjustment is returned as additional feed to step 2.

9. The process for multi-recycling, low-energy and high-purity extraction of lithium as claimed in claim 1, wherein the seventh extractive liquid is supplied to lithium battery material manufacturers as high-purity materials or dried and dehydrated as battery-grade lithium-bearing powders.

10. The process for multi-recycling, low-energy and high-purity extraction of lithium as claimed in claim 1, wherein the seventh extractive liquid is further processed using an electrodialysis membrane device or an electrolytic bath to produce high-purity lithium hydroxide and by-products of acid solutions.

* * * * *